(12) United States Patent
Hon

(10) Patent No.: US 9,278,419 B2
(45) Date of Patent: Mar. 8, 2016

(54) LENS SHAPE MACHINING METHOD AND LENS SHAPE MACHINING DEVICE FOR CARRYING OUT MEASUREMENT ALONG SPIRAL MEASUREMENT PATH

(71) Applicant: FANUC CORPORATION, Yamanashi (JP)

(72) Inventor: Yonpyo Hon, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 644 days.

(21) Appl. No.: 13/744,675

(22) Filed: Jan. 18, 2013

(65) Prior Publication Data

US 2013/0236262 A1    Sep. 12, 2013

(30) Foreign Application Priority Data

Mar. 12, 2012 (JP) .................. 2012-054972

(51) Int. Cl.
*B23Q 15/22* (2006.01)
*G05B 19/404* (2006.01)

(52) U.S. Cl.
CPC ............ *B23Q 15/225* (2013.01); *G05B 19/404* (2013.01); *G05B 2219/34146* (2013.01); *G05B 2219/37576* (2013.01); *G05B 2219/45157* (2013.01); *Y10T 409/303808* (2015.01); *Y10T 409/303864* (2015.01)

(58) Field of Classification Search
CPC .............. B23Q 15/225; G05B 19/404; G05B 2219/37576; G05B 2219/34146; G05B 2219/45157; Y10T 409/303808; Y10T 409/303864
See application file for complete search history.

(56) References Cited

U.S. PATENT DOCUMENTS 5,589,983 A    12/1996  Meyers et al.
6,246,522 B1 *  6/2001  Ishii .................... G02B 5/1866
                                                       359/566

(Continued)

FOREIGN PATENT DOCUMENTS

CN    1449888 A    10/2003
CN  102209941 A    10/2011

(Continued)

OTHER PUBLICATIONS

Office Action issued Apr. 23, 2014, corresponds to Chinese patent application No. 201310075583.X.

(Continued)

*Primary Examiner* — Ramesh Patel
(74) *Attorney, Agent, or Firm* — Hauptman Ham, LLP

(57) ABSTRACT

A shape measurement data is acquired by measuring along a spiral measurement path a lens shape which is machined along a spiral machining path. An interpolated shape measurement data at intersecting points of a radial line passing through a center of the lens shape and the spiral measurement path is acquired by interpolating the shape measurement data, and a compensated machining amount for removing a machining error at each of the intersecting points (the machining points) is calculated from the interpolated shape measurement data by interpolation. Further, a machining point compensated machining amount at each of the machining points on the spiral machining path is calculated from the calculated compensated machining amount, and a compensated machining path is created on the basis of the machining point compensated machining amount.

4 Claims, 13 Drawing Sheets

(56) References Cited

U.S. PATENT DOCUMENTS

| | | | | |
|---|---|---|---|---|
| 6,266,476 | B1 * | 7/2001 | Shie | F21S 48/2237 359/443 |
| 6,325,697 | B1 * | 12/2001 | Gottschalk | B24B 9/148 451/11 |
| 6,330,109 | B1 * | 12/2001 | Ishii | G02B 5/1866 359/566 |
| 6,498,653 | B1 * | 12/2002 | Wang | G01B 11/005 356/498 |
| 6,542,301 | B1 * | 4/2003 | Fujibayashi | G02B 15/177 359/565 |
| 6,544,102 | B2 * | 4/2003 | Schafer | B24B 13/005 451/256 |
| 6,624,943 | B2 * | 9/2003 | Nakai | G02B 5/1823 359/566 |
| 6,712,671 | B2 * | 3/2004 | Wallendorf | B24B 9/14 451/11 |
| 6,881,125 | B1 | 4/2005 | Wada | |
| 7,253,974 | B2 * | 8/2007 | Guillermin | B24B 9/148 351/204 |
| 8,599,301 | B2 * | 12/2013 | Dowski, Jr. | B24B 13/06 250/216 |
| 2003/0127759 | A1 | 7/2003 | Border et al. | |
| 2006/0253220 | A1 * | 11/2006 | McPherson | B24B 13/005 700/176 |
| 2007/0097525 | A1 | 5/2007 | Guillermin et al. | |
| 2010/0165134 | A1 * | 7/2010 | Dowski, Jr. | B24B 13/06 348/218.1 |
| 2011/0027032 | A1 * | 2/2011 | Keller | B23Q 15/013 409/131 |

FOREIGN PATENT DOCUMENTS

| | | |
|---|---|---|
| EP | 1201408 A2 | 5/2002 |
| JP | 63-232968 A | 9/1988 |
| JP | 2006-514584 A | 5/2006 |
| JP | 2007-276049 A | 10/2007 |

OTHER PUBLICATIONS

Corresponding JP 2012-054972 Notification of Reasons for Refusal dated May 7, 2013.

* cited by examiner

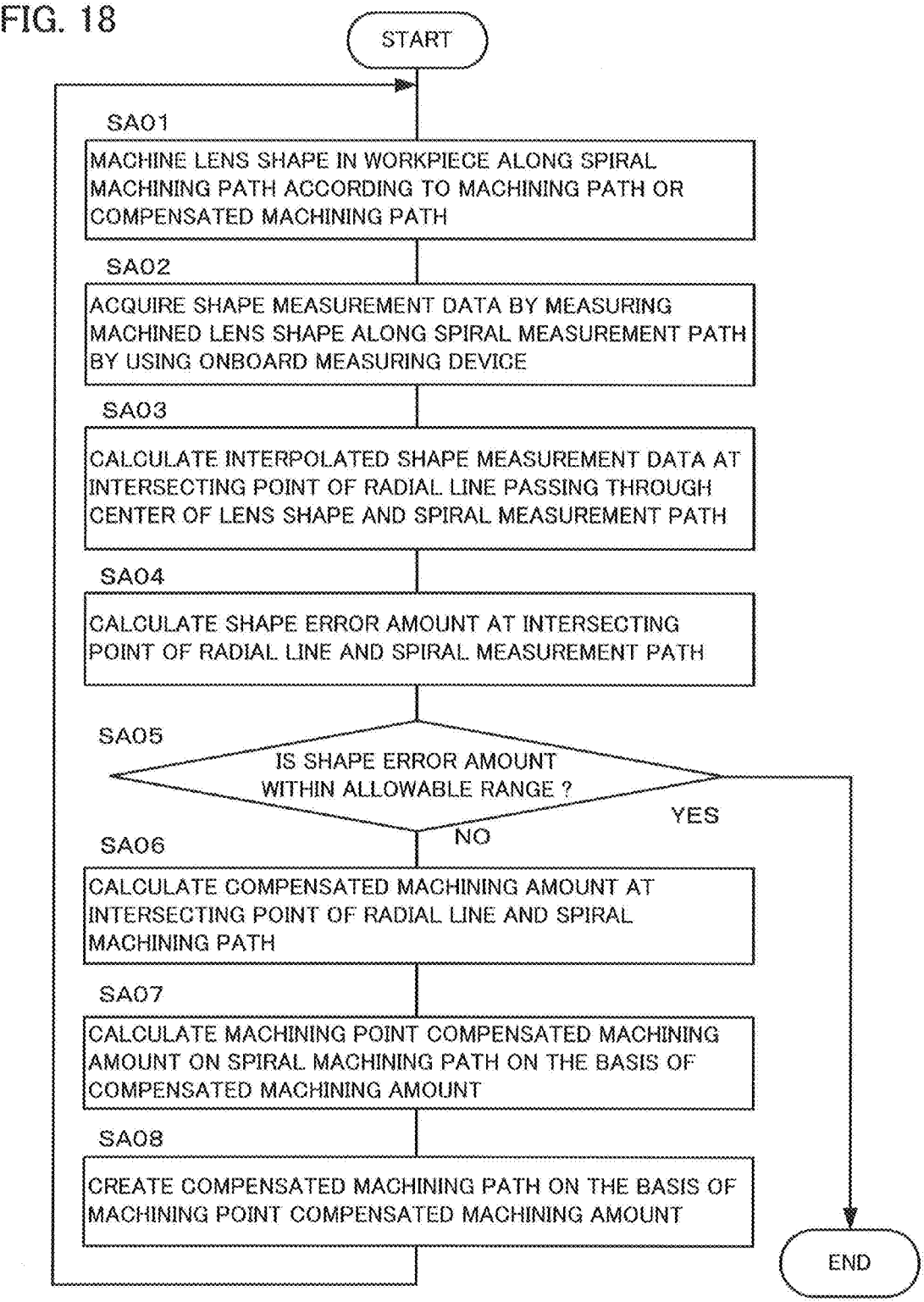

LENS SHAPE MACHINING METHOD AND LENS SHAPE MACHINING DEVICE FOR CARRYING OUT MEASUREMENT ALONG SPIRAL MEASUREMENT PATH

RELATED APPLICATIONS

The present application is based on, and claims priority from, Japanese Application Number 2012-054972, filed Mar. 12, 2012, the disclosure of which is hereby incorporated by reference herein in its entirety.

BACKGROUND OF THE INVENTION

1. Field of the Invention

The present invention relates to a lens shape machining method and a lens shape machining device for carrying out a measurement along a spiral path as well as a machining in the machining by the spiral path.

2. Description of the Related Art

In an ultra-precision machining, a compensation machining on the basis of an onboard measurement is essential for achieving a shape precision of a nanometer unit. The compensation machining on the basis of the onboard measurement is mainly carried out frequently in an optical device such as a lens or the like. The conventional lens metal mold is generally machined and compensated by machining the lens metal mold on the basis of a lathe machining, and compensating and machining an error of a shape on the basis of the onboard measurement.

On the basis of popularization of a cell phone and a smart phone and development of various high-density integrated sensors in recent years, a numerical quantity of a compact lens which is mounted on these products is increased. Accordingly, a lot of high-precision lens metal molds which are used for manufacturing the compact lens are going to be required. In the conventional lathe machining which machines the lens metal mold one by one, it is impossible to achieve a production capacity which can respond to the needs, and it is necessary to achieve a simultaneous machining of a lot of compact high-precision lenses, and a simultaneous machining of several thousands of lens arrays in some cases, for meeting the demand of the compact lens.

Consequently, it is often the case that a spiral path machining according to a milling is applied to the machining for meeting the demand of the compact lens. Since the spiral path machining comes to the lathe machining in a pseudo manner, it is an optimum machining method in the lens array machining. Further, for example, Japanese Patent Application Laid-Open No. 2007-276049 discloses a technique in which an array shape metal mold is machined by a scan machining, and a measurement using an onboard measuring device and a machining compensation on the basis of the result of measurement are carried out along a linear raster path.

In the machining of the lens array metal mold, the machining according to the spiral machining path has been conventionally carried out. On the other hand, the measurement and the compensation have been conventionally handled only by a cruciform section measurement (refer to FIG. 19). In the cruciform section measurement, it is possible to comprehend an outline tendency of vertical and lateral asymmetries of the shape, however, it is impossible to comprehend the other portions than the portion which is measured in the crisscross manner. Even if a compensated machining amount is determined according to an approximating method, a space therebetween is too large, so that it is highly likely that a compensation which is away from an actual shape error is applied.

The three-dimensional measurement and machining according to the raster path (an aggregation of the linear paths) which is disclosed in Japanese Patent Application Laid-Open No. 2007-276049 mentioned above can measure all the machining surfaces, and can machine the high-precision lens array metal mold. However, since the measurement and the machining are carried out along the linear path, a line of a linear feeding of a tool tends to be left on the machining surface, and there is a case that a micro line adversely affects an optical characteristic. Further, since there are a lot of motions such as an escaping motion and the like which are neither an effective machining nor a measuring motion, for changing to the next path after finishing one path, reduction of a man hour is prevented.

SUMMARY OF THE INVENTION

Accordingly, the present invention is made by taking the problem of the prior art mentioned above into consideration, and an object of the present invention is to provide a lens shape machining method and a lens shape machining device which carry out a measurement along a spiral measurement path as well as a machining along a spiral machining path.

In the lens shape machining method according to the present invention, the lens shape is machined by using a lens shape machining device which has an onboard measuring device, and relatively moving a tool and a machining object along a spiral machining path. The lens shape machining method includes a step of machining along the spiral machining path, a step of acquiring shape measurement data by relatively moving a probe of the onboard measuring device with respect to the machining object along a spiral measurement path having a radius increasing and decreasing amount which is larger than a radius increasing and decreasing amount of the spiral machining path, after the machining, and measuring the machining object at a measurement point on the spiral measurement path by the onboard measuring device, a step of determining interpolated shape measurement data at an intersecting point of a plurality of radial lines passing through a center of the lens shape and the spiral measurement path by interpolating the shape measurement data, a step of determining a shape error amount which is a deviation between the interpolated shape measurement data and reference data, at the intersecting point of the radial lines and the spiral measurement path, a step of determining a compensated machining amount for removing the machining error at the machining point which is the intersecting point of the radial lines and the spiral machining path, on the basis of the determined shape error amount, a step of determining a machining point compensated machining amount at each of the machining points on the spiral machining path, on the basis of the determined compensated machining amount, a step of creating a compensated machining path on the basis of the determined machining point compensated machining amount, and a step of executing the machining of the machining object by relatively moving the tool of the lens shape machining device and the machining object along the created compensated machining path.

The compensated shape measurement data may be determined by interpolating the shape measurement data at the measurement point according to a linear approximation or a curvilinear approximation of the shape measurement data.

In the lens shape machining device according to the present invention, the lens shape is machined by using the lens shape machining device having the onboard measuring device, and relatively moving the tool and the machining object along the spiral machining path. The lens shape machining device is provided with a shape measurement portion which acquires a shape measurement data by relatively moving a probe of the onboard measuring device with respect to the machining object along a spiral measurement path having a radius increasing and decreasing amount which is larger than a radius increasing and decreasing amount of the spiral machining path, after the machining along the spiral machining path, and measuring the machining object at a measurement point on the spiral measurement path by the onboard measuring device, an interpolated shape measurement data calculating portion which determines interpolated shape measurement data at an intersecting point of a plurality of radial lines passing through a center of the lens shape and the spiral measurement path by interpolating the shape measurement data, a shape error amount calculating portion which calculates a shape error amount which is a deviation between the interpolated shape measurement data and reference data, at the intersecting point of the radial lines and the spiral measurement path, a compensated machining amount calculating portion which determines a compensated machining amount for removing the machining error at the machining point which is the intersecting point of the radial lines and the spiral machining path, on the basis of the determined shape error amount, a machining point compensation amount calculating portion which determines a machining point compensated machining amount at each of the machining points on the spiral machining path, on the basis of the determined compensated machining amount, and a compensated machining path creating portion which creates a compensated machining path on the basis of the determined machining point compensated machining amount. Further, the machining of the machining object is executed by relatively moving the tool of the lens shape machining device and the machining object along the created compensated machining path.

The compensation shape measurement data calculating portion may determine the interpolated shape measurement data by interpolating the shape measurement data at the measurement point according to a linear approximation or a curvilinear approximation of the shape measurement data.

According to the present invention, it is possible to provide the lens shape machining method and the lens shape machining device which carry out the measurement along the spiral measurement path as well as the machining along the spiral machining path.

BRIEF DESCRIPTION OF THE DRAWINGS

The object mentioned above, the other objects and the features of the present invention will be apparent from the following description of embodiments with reference to the accompanying drawings. Among the drawings:

FIGS. 16A and 16B are views describing an example in which a lens shape is measured on the basis of a measurement which is carried out in the lens shape machining according to the present invention, after machining along the first spiral path of the lens shape machining, in which FIG. 16A is a view obtained by plotting error values with respect to an X coordinate, and FIG. 16B is a view obtained by three-dimensionally plotting measurement data obtained by measuring along the spiral measurement path;

FIGS. 17A and 17B are views describing a measurement result which is obtained by determining a compensated machining amount according to a method of the present invention, carrying out the machining along the spiral machining path again by adding the compensated machining amount to the first spiral machining path in FIG. 16 and then carrying out the measurement along the spiral measurement path again, in which FIG. 17A is a view obtained by plotting the error values with respect to the X coordinate, and FIG. 17B is a view obtained by three-dimensionally plotting the measurement data obtained by measuring along the spiral measurement path;

FIG. 18 is a flowchart describing a process of carrying out the machining and the measurement according to the present invention.

DETAILED DESCRIPTION OF THE PREFERRED EMBODIMENTS

Figure 1:
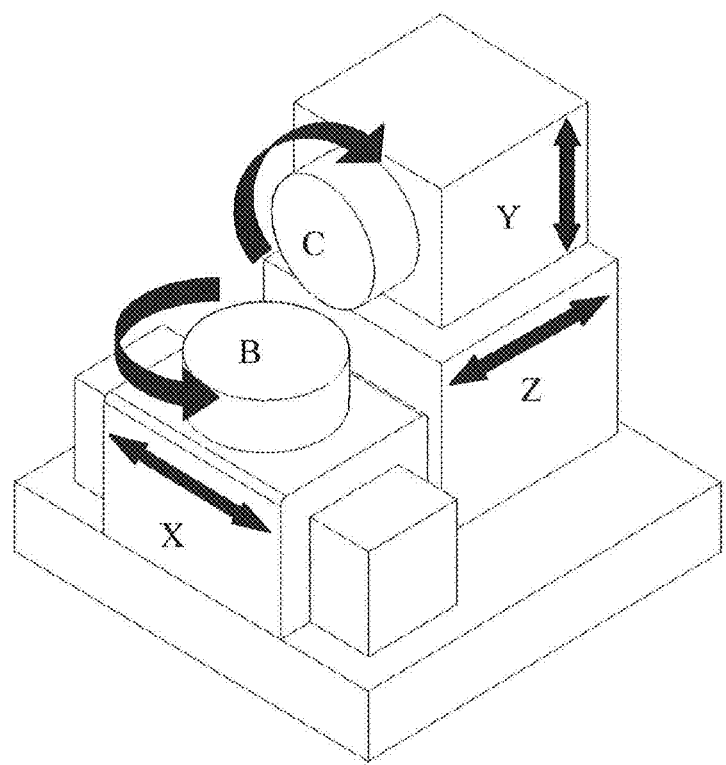
FIG. 1 is a view describing a substantial part of a machine tool which has three rectilinear axes, an X axis, a Y axis and a Z axis, and further has two rotating axes, a B axis arranged on the X axis and a C axis arranged on the Y axis.

The present invention relates to a method and a device which carries out a measurement along a spiral measurement path, determines a compensated amount of the machining on the basis of a result of measurement and carries out a compensated machining, for compensating a shape error which is generated due to a profile error of a tool or the like, in the machining by a spiral machining path which is mainly used for a lens shape machining method.

In a rotating milling tool, a rotating locus does not come to a perfect circle, but generally comes to an oval shape, due to an oscillation in a radial or thrust direction of the tool at the rotating time, in addition to the profile error of the tool itself. In the machining in the state mentioned above, in addition to undulation of the surface caused by the tool profile error, vertical and lateral shapes of the lens metal mold become asymmetrical.

Accordingly, in order to accurately measure the shape error of the lens metal mold, it is necessary to comprehend a distribution of the shape error of a whole surface of the lens metal mold by carrying out the measurement along the spiral measurement path which is the same as the spiral machining path. However, the spiral machining path generally comes to a dense path by making a decreasing amount of a spiral radius very small while taking into consideration a surface roughness (10 nm or less in the case of an ultra-precision). Accordingly, it is ideal to completely comprehend all the surfaces by making the spiral measurement path absolutely the same as the spiral machining path mentioned above, however, a measuring time is elongated by doing so, and an influence of a drift of the measurement data due to a thermal displacement can not be negligible. Further, an amount of data which is obtained by measuring becomes enormous, and a man hour for carrying out the compensated machining on the basis of the measured data is increased. As a result, there is a possibility that a purpose of lowering a machining precision and improving an original production capacity is impaired.

Accordingly, in order to solve the problem at a time of carrying out the measurement along the spiral machining path, the present invention is characterized in that a machining of a high-precision lens shape is carried out by carrying out the measurement by a spiral measurement path which is thinned out by applying a decreasing amount of a spiral radius which is greater than a decreasing amount of a spiral radius of the spiral machining path to the spiral machining path, and determining a compensated machining amount accurately even in a machining portion which is not measured by the thinning. The spiral measurement path is formed by an optional number of measurement point rows. In this case, the spiral path in the spiral machining path and the spiral measurement path means a locus centering on an optical axis of a probe in the tool or the onboard measuring device, at a time of looking down the lens shape from a direction of the optical axis.

As a specific method of the present invention, a measurement is carried out along a spiral measurement path by thinning out a lens shape having a shape equation, and the obtained shape measurement data is aligned like a radial line per optional angles in such a manner as to intersect with each of points on the spiral machining path (in a lens cross section in the case of looking the lens from the above, a profile having an approximate shape error is created at each of the measurement points formed like a radial line). The alignment is carried out on the basis of an approximate interpolation.

After aligning the shape measurement data like the radial lines, a compensated machining amount at an intersecting point of the locus of each of the radial lines and the spiral machining path is determined on the basis of a profile of a shape which is created by using the shape measurement data obtained by the measurement. However, since the compensated machining point becomes dense in an inner side and becomes sparse toward an outer side by determining the compensated machining amount by the radial line shape, the compensated machining amount is determined per pitches of the points of the original machining path by approximating the point between them. Thereafter, a high-precision compensated machining is achieved by adding the compensated machining amount to the data of each of the points in the original machining path and machining again. The alignment of the shape measurement data is formed as radial line shape since the cross-sectional shape expression is the same at any angle in the radial line so that it becomes easy to compute. The error by each of the approximations can be held down to an approximation error which is equal to or less than nanometer in single FIGURE even by a simple linear approximating interpolation, by making an angle of the radial line sufficiently fine while taking a tolerance into consideration.

Next, a description will be given of an aspect of the lens shape machining device according to the present invention, which carries out the measurement along the spiral measurement path with reference to FIGS. 1, 2 and 3.

FIG. 1 is a view describing a machine tool which is controlled by the numerical controller, and is constructed by three or more rectilinear axes and one or more rotating axes.

The machine tool has three rectilinear axes, an X axis, a Y axis and a Z axis, and has two rotating axe, a B axis arranged on the X axis and a C axis arranged on the Y axis, and can carry out a five-axes simultaneous control. It is possible to carry out a process of a work at a precision of nanometer order, by controlling each of the movable axes in a nanometer order.

Figure 2:
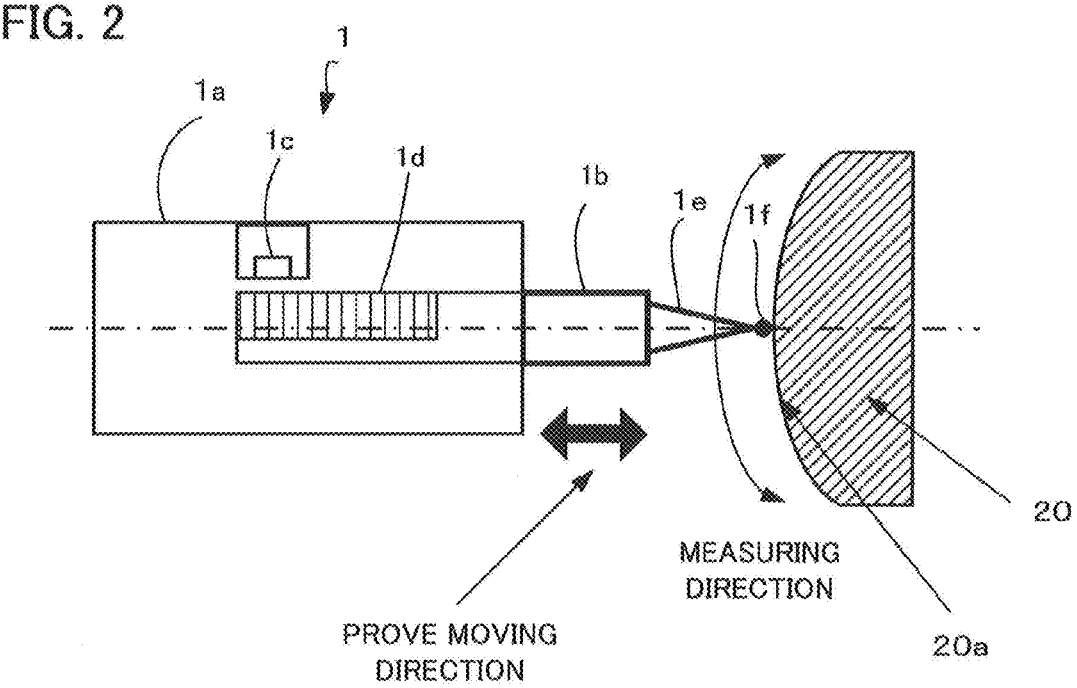
FIG. 2 is a view illustrating how to carry out a shape measurement of a measurement object on the basis of displacement information of a probe, wherein the probe is a movable portion of an onboard measuring device and a movement displacement of the probe is detected by a linear scale and a laser head, and the prove is relatively moved along a surface of a machining object.

FIG. 2 is a cross-sectional view of a substantial part describing one example of the onboard measuring device which is attached to a machine tool.

An onboard measuring device 1 is provided with a probe 1b which is a movable portion housed in a case 1a. The probe 1b can move in a direction of a center axis by a bearing (not illustrated) such as an air bearing or the like. A rod 1e of a measuring element, provided with a spherical measuring element 1f, is attached to one end of the probe 1b. The rod 1e of the measuring element is a fine rod-like member. Further, one end of the rod 1e of the measuring element is fixed to the probe 1b, and the spherical measuring element if is attached to the other end. The spherical measuring element if comes into contact with a machining object surface 20a of a machining object 20, and carries out a shape measurement. It is possible to measure a surface shape of the machining object surface 20a of the machining object 20 by moving the probe 1b along the machining object surface 20a and measuring a displacement of the probe 1b.

The onboard measuring device 1 is provided with a linear scale 1d and a laser head 1c within the case 1a. The linear scale 1d and the laser head 1c constitute means for detecting a movement displacement of the probe 1b. Note that, a displacement detecting means using the laser head 1c and the linear scale 1d is well known. As illustrated in FIG. 2, the onboard measuring device 1 is moved along the machining object surface 20a of the machining object 20, and a displacement of the probe 1b is detected by the movement displacement detecting means (the linear scale 1d and the laser head 1c). The movement displacement detecting means outputs a movement displacement detecting signal which represents the displacement of the probe 1b (refer to FIG. 3). The movement displacement detecting signal is input as a measurement signal ipf from the onboard measuring device 1 to a personal computer 11 which will be mentioned later, and is stored as position information of the probe 1b received from the onboard measuring device 1.

Figure 3:
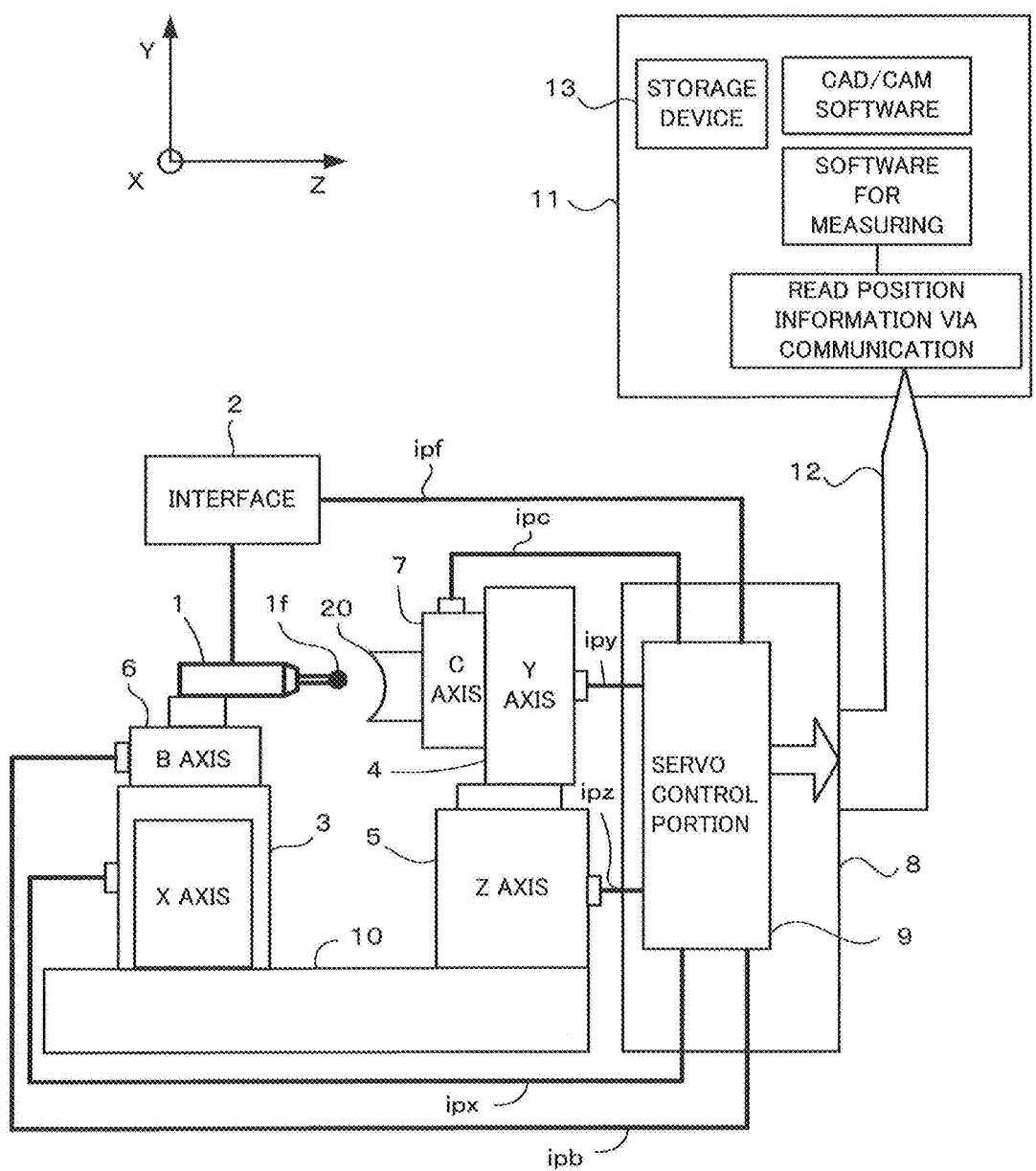
FIG. 3 is a view describing a system which has a machine tool provided with the onboard measuring device, and a numerical controller controlling the machine tool.

FIG. 3 is a view describing one example in which the onboard measuring device and the machine tool are connected. Respective axes of the X, Y, Z, B and C of the machine tool and the onboard measuring device which is attached to the B axis serving as a rotating shaft have interfaces of the same construction. That is, each of the X, Y, Z, B and C axes is provided with the interface for controlling each of the axes. Although the onboard measuring device 1 does not constitute a movable shaft of the machine tool, the signal obtained from the onboard measuring device 1 is stored in the personal computer 11 via a servo control portion 9 of the numerical controller 8 in the same manner as each of the movable axes X, Y, Z, B and C of the machine tool, by assuming the onboard measuring device 1 as a movable shaft of the machine tool. When attaching the onboard measuring device 1 to the machine tool, the onboard measuring device 1 is accommodated in an accommodating device 24 which is provided with an automatic opening and closing cover 25 as mentioned later.

Since the respective axes (five movable axes) of the machine tool and the onboard measuring device have the interface of the same structure, a position detecting signal from a position detector (not illustrated) of each of the axes and a position detecting signal from the onboard measuring device are easily input, in synchronization with each other, to a feed axis drive control portion of the numerical controller. Further, the numerical controller 8 and the personal computer 11 carry out a LAN communication via an Ethernet (registered trade mark) 12, and the position information of each of the axes and the displacement information of the probe of the onboard measuring device 1 are simultaneously input to the personal computer 11 which is an external storage device. FIG. 3 illustrates carrying out of measurement by utilizing a measuring software for storing the input position information of respective axes and displacement information of the probe. Further, according to one embodiment of the present invention, in the personal computer 11, a compensated machining program is created by compensating a machining program by using a shape data of the machining object 20 which is obtained by measuring.

FIG. 3 illustrates an example in which the measurement signal from the onboard measuring device is input to the personal computer via the numerical controller.

In this example, the respective axes of the machine tool and the onboard measuring device 1 attached to the B axis being a rotating shaft have interfaces of the same construction, the position detecting signal of each of the axes and the measurement signal of the onboard measuring device 1 are easily input, in synchronization with each other, to the servo control portion 9 which is the feed axis drive control portion of the numerical controller 8.

A description of one example of the onboard measuring device 1 is given with reference to FIG. 2. Position detecting signals ipx, ipy, ipz, ipb and ipc which are output from a position detecting device (not illustrated) embedded in a servo motor driving each of the axes (the X axis 3, the Y axis 4, the Z axis 5, the B axis 6 and the C axis 7) of the machine tool are input in a feedback manner to the servo control portion 9 of the numerical controller 8. Similarly, a position detecting signal ipf which is a measurement signal relating to a movement displacement of the probe 1b is input from the onboard measuring device 1 measuring a surface shape of a machining object W via the interface 2, to the servo control portion 9.

The position detecting signal which is output from the position detecting device in each of the movable axes of the machine tool is input to the servo control portion 9 via an interface (not illustrated). The interface is structured such that the position detecting signal which is output from the position detecting device embedded in the servo motor and the measurement signal which is output from the onboard measuring device 1 are input, in synchronization with each other, to the servo control portion 9 of the numerical controller 8.

Further, the numerical controller 8 is provided with a storage unit (not illustrated) which stores a position information of each of the movable axes of the machine tool 1 and a measured information (a position information) from the onboard measuring device 1, and an interface which delivers the position information stored in the storage unit to the personal computer 11 of the external device.

Since the position detecting signal which is the feedback signal from each of the movable axes of the machine tool and the measurement signal from the onboard measuring device are acquired by the servo control portion 9 of the numerical controller 8 via the interface 2 having the same circuit structure, the measurement signals from the position detecting device in each of the axes and the onboard measuring device (that is, the axial position detecting signal of each of the axes and the position detecting signal of the onboard measuring device) are easily and synchronously input to the numerical controller 8. Further, the read measurement signal is stored as the position information in a storage unit (not illustrated) of the numerical controller 8.

Further, the numerical controller 8 carries out a LAN communication via the Ethernet (registered trade mark) 12, for example, with the personal computer 11 which is the external device, and transmits the position information from each of the axes and the measured information from the onboard measuring device 1 to the personal computer 11, in the storage device 13 which is connected to or embedded in the personal computer 11. The personal computer 11 stores the position information from each of the axes and the position information from the onboard measuring device 1, in synchronization with each other, in the storage device 13 for each a sampling cycle. The measuring software is stored in the personal computer 11, and executes a predetermined computing process such as a shape measurement of the machining object or the like, on the basis of the position information which is read via the numerical controller 8.

Figure 4A:
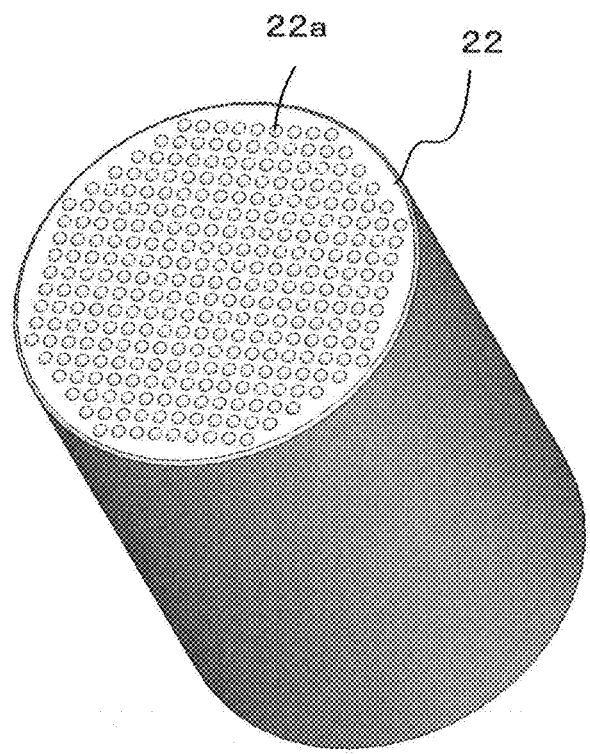
FIG. 4A is a perspective view describing an example of a lens array metal mold to which a machining according to a spiral path is applied.
Figure 4B:
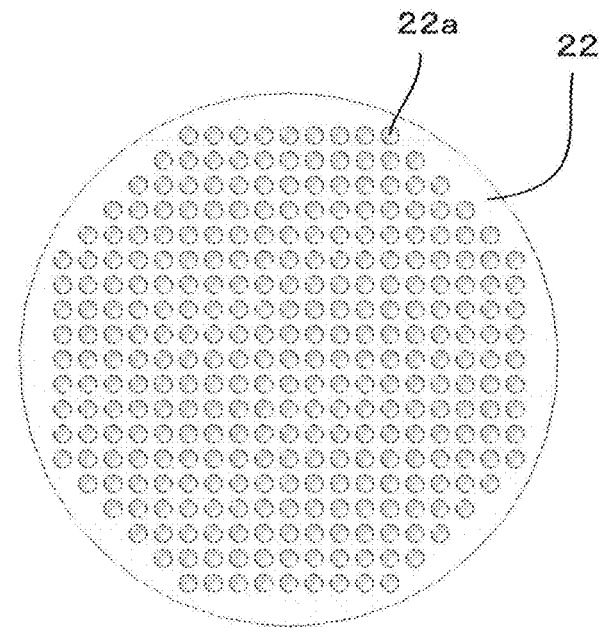
FIG. 4B is a plan view of the lens array metal mold in FIG. 4A.

FIG. 4A is a perspective view describing an example of a lens array metal mold to which the machining by the spiral path is applied, and FIG. 4B is a plan view of the lens array metal mold of FIG. 4A. A lot of the same lens shapes 22a are arranged on a plane or a curved surface, and one lens metal mold 22 is generally constituted by an integrated body of several hundreds to several thousands of lens shapes.

Figure 5:
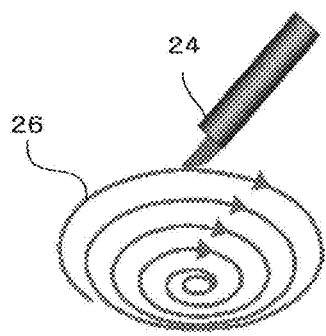
FIG. 5 is a view describing a machining along a spiral machining path.

FIG. 5 is a view describing the machining along the spiral machining path. A tool 24 relatively moves along a spiral machining path 26 with respect to a workpiece (not illustrated) so as to machine a lens shape on the workpiece.

Figure 6:
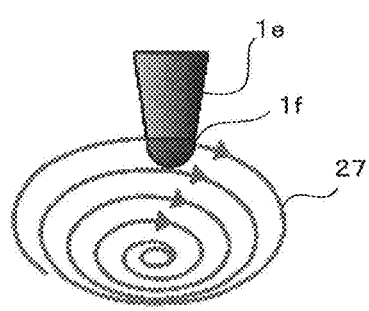
FIG. 6 is a view describing a measurement along a spiral measurement path.

FIG. 6 is a view describing the measurement along a spiral measurement path 27. The rod 1e of the measuring element, to the leading end of which the spherical measuring element if is attached, is attached to one end of the probe 1b of the onboard measuring device 1 illustrated in FIG. 2. The spherical measuring element if carries out the measurement along the spiral measurement path 27 which has the same spiral path as that in machining. In the case that a milling machining by a ball end mill is carried out on the basis of the measurement by the onboard measuring device 1, it is possible to comprehend all the asymmetries of shape which are generated by rotation oscillation of the tool and the fluctuations of irregular shape errors which are generated by change of a contact tool surface.

In this case, a description will be given of a relationship between a radius increasing and decreasing amount ΔRa of the spiral machining path and a radius increasing and decreasing amount ΔRb of the spiral measurement path.

Figure 7:
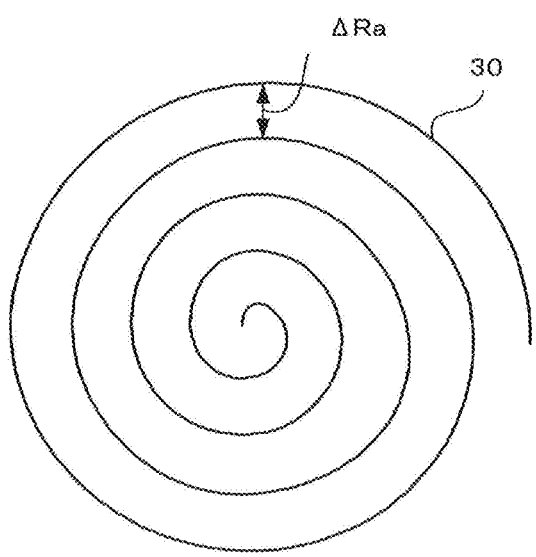
FIG. 7 is a view describing a radial increasing and decreasing amount of the spiral machining path.
Figure 8:
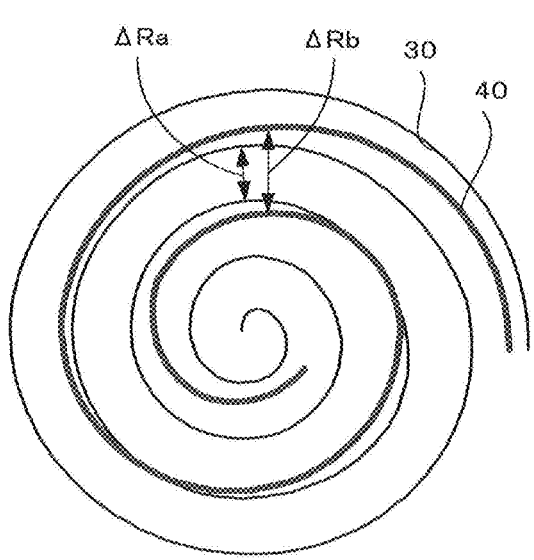
FIG. 8 is a view describing one example of the measurement path which corresponds to the machining path constituted by the spiral path, in the present invention, wherein a radial increasing and decreasing amount of the spiral measurement path is equal to or more than the radial increasing and decreasing amount of the spiral machining path.

FIG. 7 is a view describing the radius increasing and decreasing amount ΔRa of the spiral machining path. FIG. 8 is a view describing the spiral machining path and the spiral measurement path.

In the case that the workpiece is machined along a spiral machining path 30, a distance between the spiral machining path 30 and the adjacent spiral machining path 30 is set to the radial increasing and decreasing amount ΔRa of the spiral machining path. Further, a distance between a spiral measurement path 40 and the adjacent spiral measurement path 40 is set to the radial increasing and decreasing amount ΔRb of the spiral measurement path. FIG. 8 shows the fact that the radius increasing and decreasing amount ΔRb of the spiral measurement path is greater than the radius increasing and decreasing amount ΔRa of the spiral machining path (ΔRb>ΔRa).

Note that, the following expressions (1) and (2) express the shape expression of the lens shape. The expression (1) is a two-dimensional cross-sectional expression, and the expression (2) is a three-dimensional expression. The machining of the workpiece (the lens metal mold) is carried out along the spiral machining path 30 on the basis of the shape expression of the lens shape in the expression (2). In the expression (2), reference symbols X and Y denote distances in a direction of an X axis and a direction of a Y axis from a center of the lens shape, reference symbol R denotes a radius of curvature, and reference symbol k denotes Korenich coefficient.

$$Z = \frac{X^2}{R(1 + \sqrt{1-(k+1)X^2/R^2})} + \sum_{i=1}^{20} A_i |X|^i \quad (1)$$

$$Z = \frac{X^2 + Y^2}{R(1 + \sqrt{1-(k+1)\cdot(X^2+Y^2)/R^2})} + \sum_{i=1}^{20} A_i \left|\sqrt{X^2+Y^2}\right|^i \quad (2)$$

Note that, the shape expression of the lens shape is expressed by the expression (1) or the expression (2) mentioned above only as one example, but may be expressed by the other relationship expression, for example, a shape expression which expresses a simple plane such as Z=a×X+b.

Figure 9:
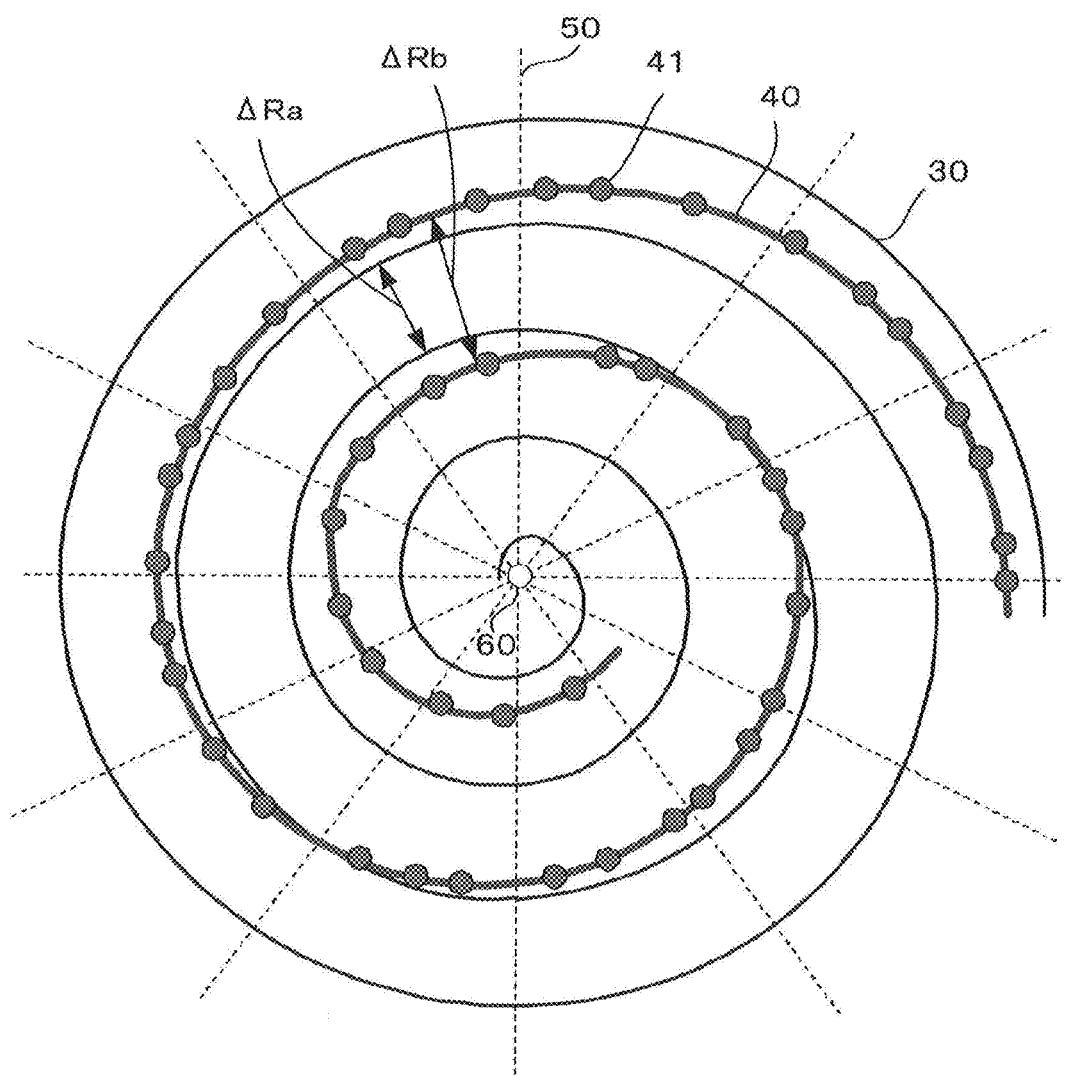
FIG. 9 is a view describing a detail of measurement of a workpiece which is carried out along the spiral measurement path.

A description will be given of the measurement of the workpiece carried out along the spiral measurement path with reference to FIG. 9.

A plurality of points 41 positioned on the spiral measurement path 40 are actual measurement points. A radial line 50 extends from a center 60 of the lens shape at even angles. Here, a relationship between the radius increasing and decreasing amount ΔRb of the spiral measurement path and the radius increasing and decreasing amount ΔRa of the spiral machining path is shown by ΔRa≤ΔRb. In FIG. 9, ΔRa<ΔRb is established. Accordingly, since the radius increasing and decreasing amount of the spiral measurement path is larger than the radius increasing and decreasing amount of the spiral machining path, it is possible to carry out the shape measurement in a thinning manner, and it is possible to achieve an effect of improving a measuring precision due to reduction of a measuring time and reduction of a temperature drift.

Note that, the present invention can be applied even to the case of ΔRa=ΔRb, however, it is difficult to achieve the reduction of the measuring time in this case.

The actual measurement is carried out by acquiring displacement data of a mechanical coordinate and the probe 1f for every fixed sampling cycles, at a time when the probe 1f (refer to FIG. 2) of the onboard measuring device 1 moves along the spiral measurement path 40. The obtained data is set to the shape measurement data. It is difficult to completely fix the sampling cycles for acquiring the displacement data of the probe 1f, and the sampling cycles actually have certain degree of dispersion. Therefore, the distances between the measurement points 41 become uneven as illustrated in FIG. 9.

Figure 10:
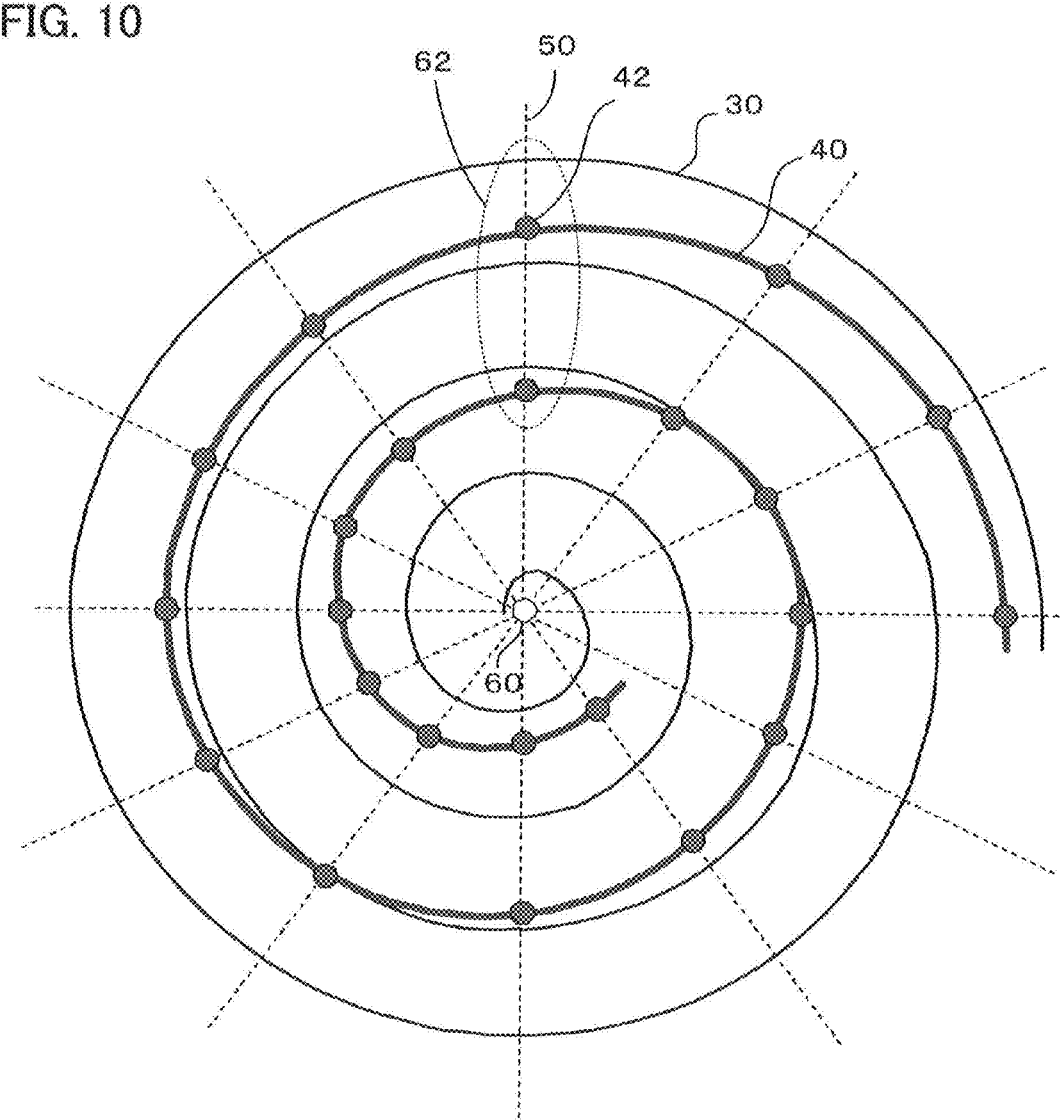
FIG. 10 is a view describing shape measurement data, which corresponds to a shape error obtained by measuring along the spiral measurement path after machining along the spiral machining path, that are arranged on radial lines which passes through machining points of the machining path and are arranged at optional angles through a center of a lens shape.

A description will be given of arrangement of shape measurement data serving as the shape error, obtained along the spiral measurement path after machining along the spiral machining path, on the radial lines which pass through the machining points of the spiral machining path and are arranged at every optional angle to pass through the center of the lens shape, with reference to FIG. 10.

As described with reference to FIG. 9, there is often the case that the shape measurement data does not exist due to the dispersion of the measurement points 41 on a plurality of radial lines 50 which are arranged in such a manner as to pass through the machining points of the spiral machining path 30 from the center 60 of the lens shape. In this case, it is possible to determine an approximate value (interpolated shape measurement data) at a point (a pseudo measurement point 42) between an actual measurement point and the adjacent measurement point, by using a known interpolation method such as a linear interpolation which carries out a linear approximation, and a spline interpolation which carries out a curvilinear approximation (refer to FIG. 11). At that time, an accurate approximate value can be determined by taking into consideration the three-dimensional shape expression of the lens shape. In other words, in the case that the measurement point smoothly changes between the measurement point and the adjacent measurement point, it is sufficient to apply only the interpolation, however, in the case that a micro projection or a depression exists between the measurement point and the adjacent measurement point, there may be a case that it is insufficient to apply only an interpolation that connects the points one another by the straight lines. In this case, it is possible to minimize an influence thereof by more finely sampling. Note that machining points are designated, as sequence of points having micro distances, along the spiral machining path, in the machining program. In the case of the ultra-precision machining, by making the distance between the points very small (for example, small as much as a desired tolerance amount), it is possible to achieve a surface roughness of several nanometer order only by an interpolation that connects the points one another with straight lines.

Figure 11:
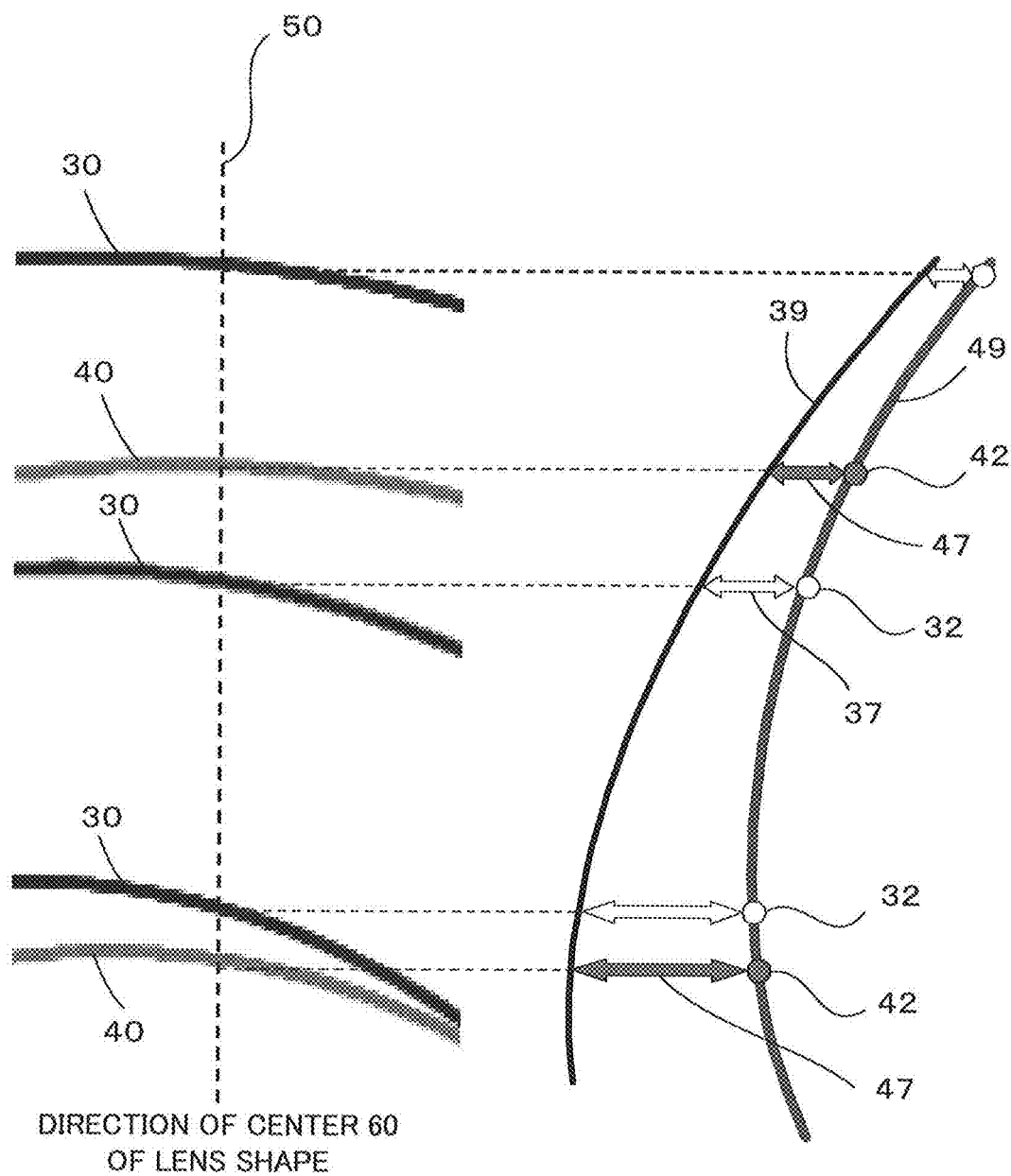
FIG. 11 is a view describing determination of a compensated machining amount for removing the shape error in the machining path which intersects with each of the radial lines by using the shape measurement data on each of the radial lines.

A description will be given of determination of a compensated machining amount for removing a shape error in the spiral machining path which intersects with each of the radial lines, by using the shape measurement data on each of the radial lines, with reference to FIG. 11. A left view of FIG. 11 is a view obtained by enlarging a position illustrated by a broken line 62 in FIG. 10, and a right view of FIG. 11 is a view as seen from a direction of a cross section of the left view.

Since the radial increasing and decreasing amount ΔRb of the spiral measurement path is larger than the radial increasing and decreasing amount ΔRa of the spiral machining path (ΔRb>ΔRa), the measurement is less likely to be able to be carried out on the spiral machining path 30 (the spherical measuring element if of the measuring device 1 is less likely to be able to pass above the spiral machining path 30 at a time of the measurement). Accordingly, as illustrated by the right view of FIG. 11, a profile 49 of an actual shape which is obtained by creating on the basis of the shape measurement data is formed by connecting the pseudo measurement points 42 according to an interpolation by curvilinear approximation or linear approximation. Note that, as mentioned above, even if ΔRa=ΔRb is set, and the measurement path is made to coincide with the machining path, it is possible to carry out the measurement to be carried out in the lens shape machining according to the present invention.

The deviation between a theoretical shape expression profile 39 described by the expression (1) and the profile 49 of the actual shape obtained by measuring, which connects pseudo measurement points 42 on the radial line 50, comes to a shape error amount 47. The shape error amount 47 comes to a machining amount to be compensated, however, a work for converting it into a machining point compensated machining amount on the actual machining point on the spiral machining path 30 is necessary. Accordingly, a difference between the profile 49 of the actual shape obtained by measuring and the theoretical shape expression profile 39 is determined at an intersecting point of the radial line 50 and the spiral machining path 30 (the compensated machining point 32). The determined difference comes to a compensated machining amount 37 at the machining point on the spiral machining path 30.

A description will be given of the compensated machining point on the spiral machining path after determining the compensated machining amount at the machining point intersecting the radial line, with reference to FIG. 12. The compensated machining amount 37 at the compensated machining point 32 on the spiral machining path 30 is determined.

Figure 13:
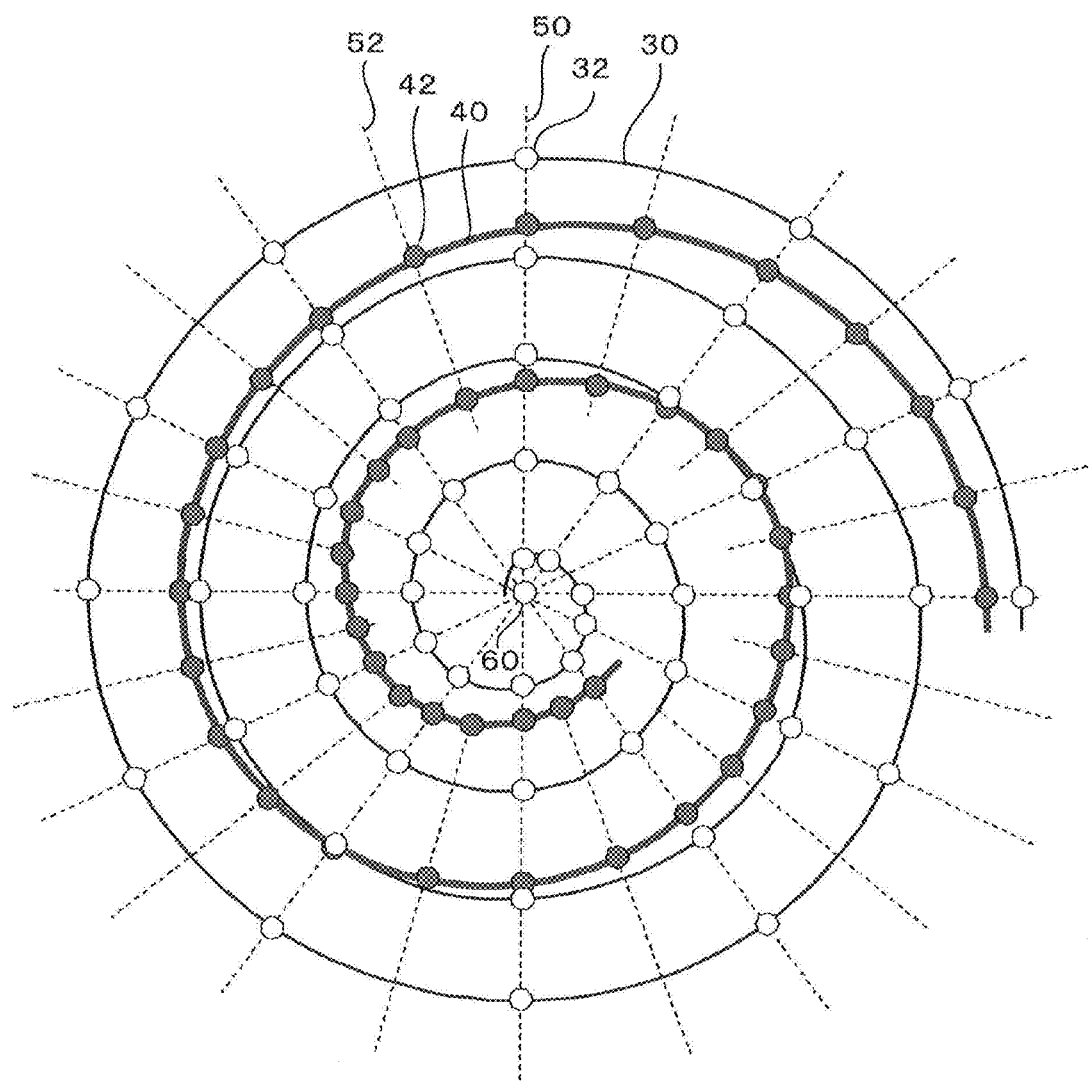
FIG. 13 is a view describing a method of preventing reduction of a compensated machining precision which is generated in the case that a distance between the compensated machining points becomes wider toward an outer side on the basis of division per optional angle of the radial lines.

On the basis of division per an optional angle by radial lines, a distance between the compensated machining point and the compensated machining point becomes wider little by little toward the outer side, however, a description will be given of a method of preventing the reduction of the compensated machining precision which is generated in this case, with reference to FIG. 13.

The position at which the distance between the compensated machining point and the compensated machining point is wide is handled by further segmentalizing between the compensated machining point and the compensated machining point by an additional radial line 50. In this case, the radial line 52 to be added by segmentalizing should not be extended to the center, but should be extended to a necessary and sufficient distance. The measurement data in the pseudo measurement point 42 which intersects with the added radial line 52 is determined by the same method as described with reference to FIG. 10.

Figure 14:
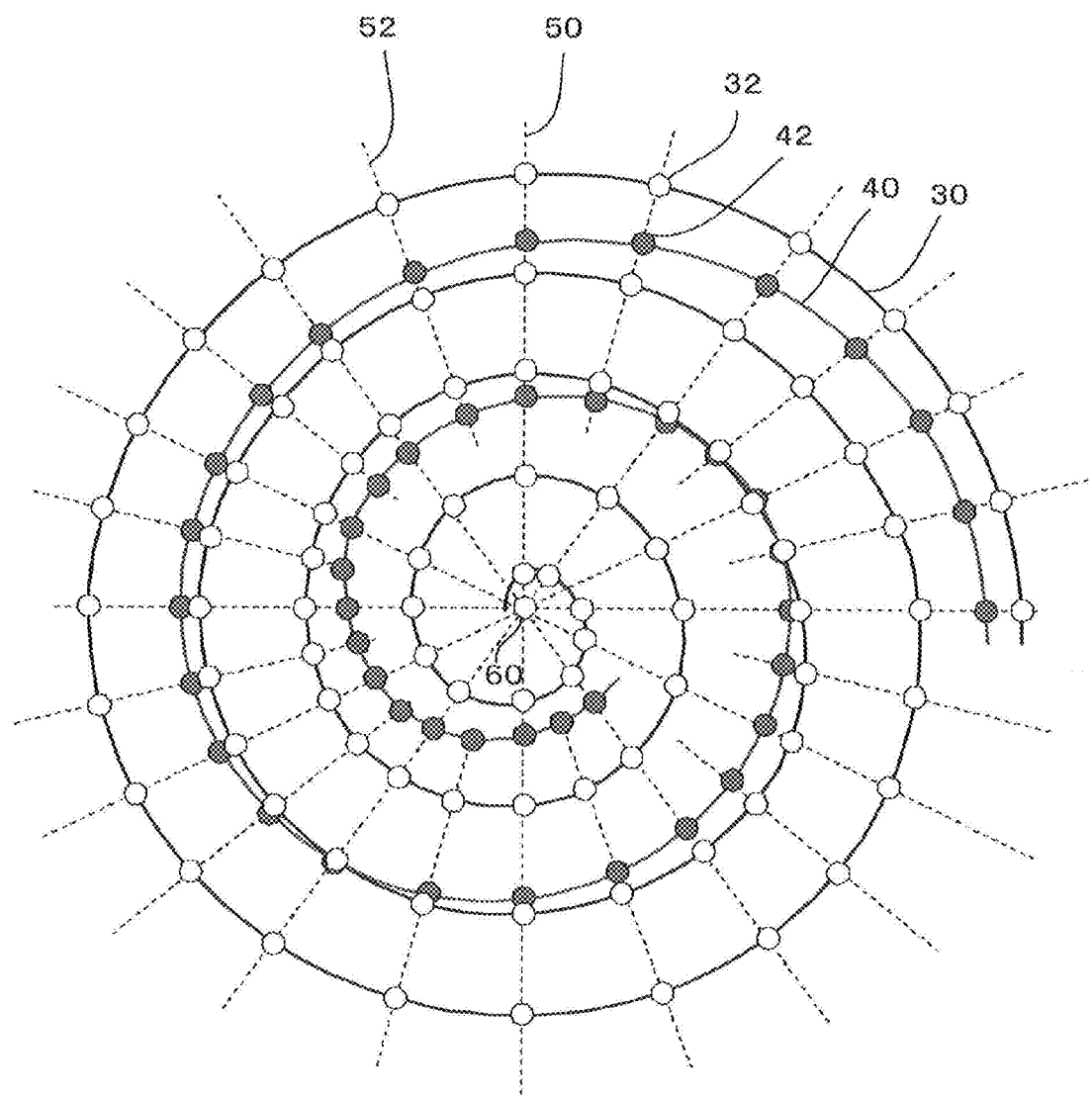
FIG. 14 is a view describing determination of the compensated machining amount at the machining point (the compensated machining point) which intersects with the radial line on the basis of the method of FIG. 11, after segmentalizing the radial lines in FIG. 13 and determining the interpolated shape measurement data at a pseudo measurement points which intersect with the segmentalized and increased radial lines.

A description will be given of determination of the compensated machining amount at a machining point (the compensated machining point 32) intersecting with the radial line 52 of which number is increased by the method in FIG. 11, after segmentalizing the radial lines in FIG. 13, and determining the interpolated shape measurement data at the pseudo measurement point intersecting with the radial line of which number is increased by the segmentalization, with reference to FIG. 14.

Figure 12:
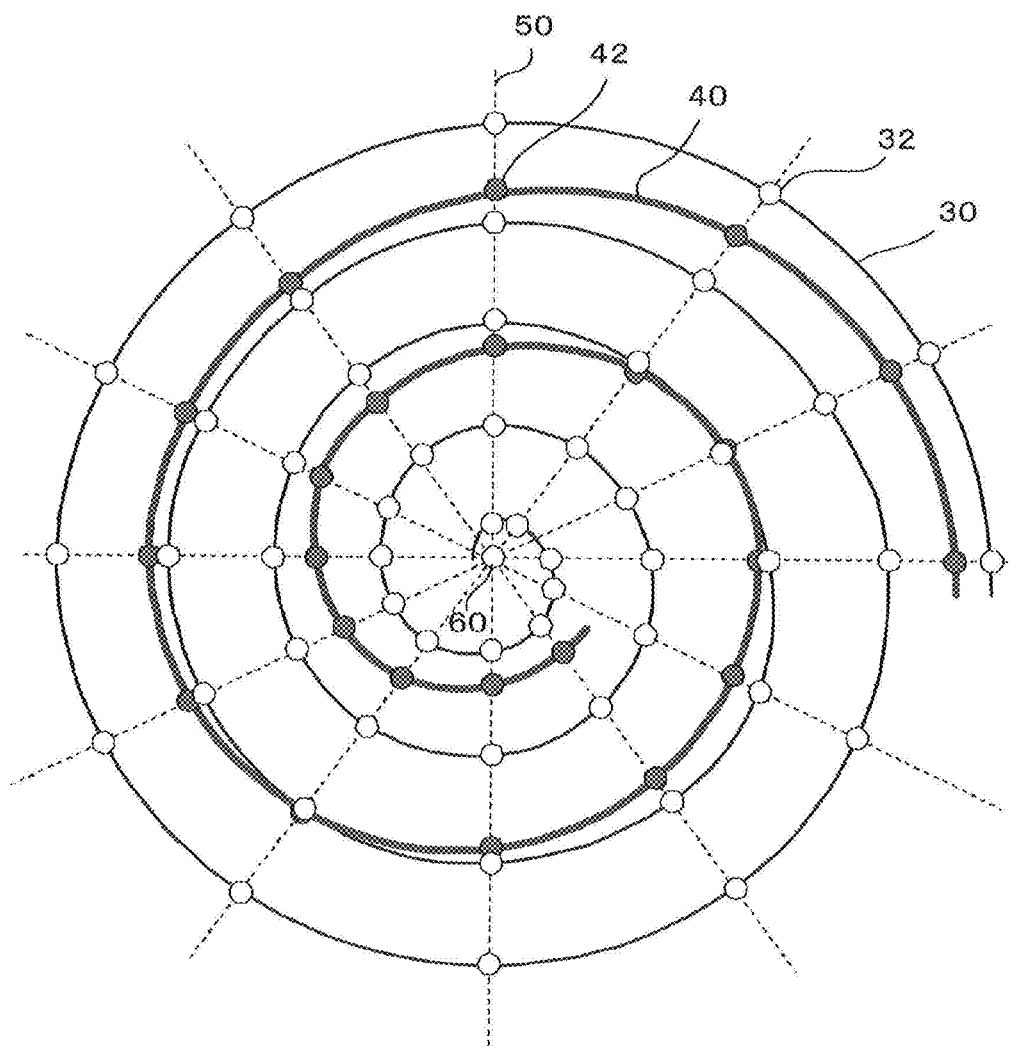
FIG. 12 is a view describing a compensated machining point on the spiral machining path after determining the compensated machining amount at the machining points which intersect with the radial lines.

In comparison with FIG. 12, the compensated machining points 32 become denser. The compensated machining points 32 are made denser because the compensated machining points 32 having narrower pitch distances can be arranged on the spiral machining path 30 which is the actual machining path, and a precision of approximation is raised in the denser compensated machining points at a time of determining between the compensated machining points 32 on the basis of the approximation, thereby improving the precision of the compensated machining. The density of the compensated machining points 32 can be set dependent on a shape change of the machined lens shape, and in the case that the shape change is smooth, the error attributable to the approximation may not become larger even when the gap between the compensated machining points 32 is relatively wide.

Figure 15:
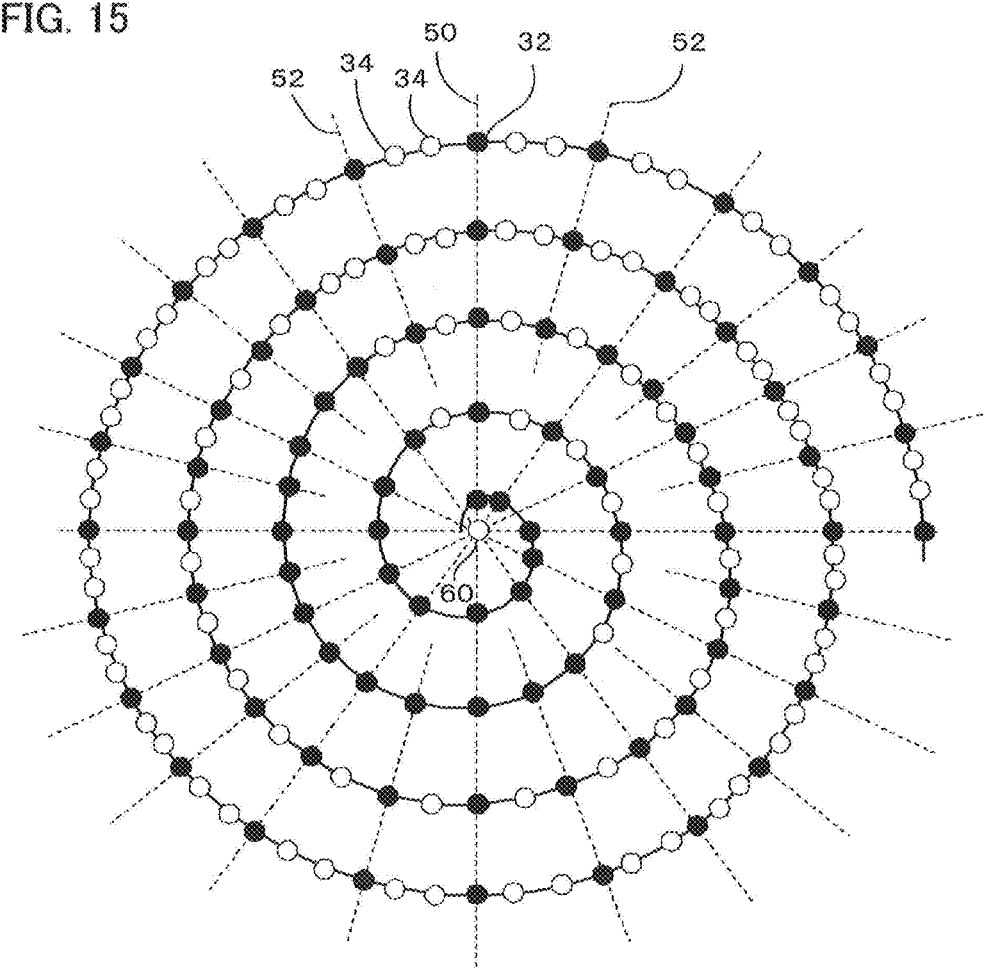
FIG. 15 is a view describing determination of the compensated machining amount at each of division points on the basis of an approximate interpolation by dividing between the machining points (the compensated machining points) which intersect with the radial lines and at which the compensated machining amounts, determined by the approximation from the measurement point, are known, per actual machining pitches.

A description will be given of determination of the compensated machining amount 37 at each of division points on the basis of an approximate interpolation by dividing between the machining points (the compensated machining points) which intersect with the radial lines and at which the compensated machining amounts, determined by the approximation from the measurement point, are known, per actual machining pitches, with reference to FIG. 15.

The approximate compensated machining amount is determined at a division point 34 between the compensated machining point 32 and the compensated machining point 32. In other words, since the division point 34 is also the machining point, the machining point compensated machining amount at the division point 34 is determined. Since the compensated machining point 32 is also a machining point, it is possible to name the machining point compensated machining amount at the compensated machining point 32 and the machining point compensated machining amount at the division point 34 generically as machining point compensated machining amount. The machining point compensated machining amount is a machining compensated amount for removing the machining error of the workpiece.

The interpolation of the compensated machining amount 37 at each of the divided points 34 can employ a known interpolation method such as a linear interpolation, a spline interpolation or the like, and the denser the distance between the radial lines is, the simpler the approximation is, and the more the precision is improved. Since a machining point compensated machining amount 38 at each of the machining points described in the machining program is determined by carrying out the interpolation of the compensated machining amount 37 at each of the division points 34 as illustrated in FIG. 15, and the compensated machining path is created by adding the determined machining point compensated machining amount 38 to the machining coordinate at all the machining points of the machining program, the compensated machining which will prevent occurrence of shape error is achieved.

Figure 16A:
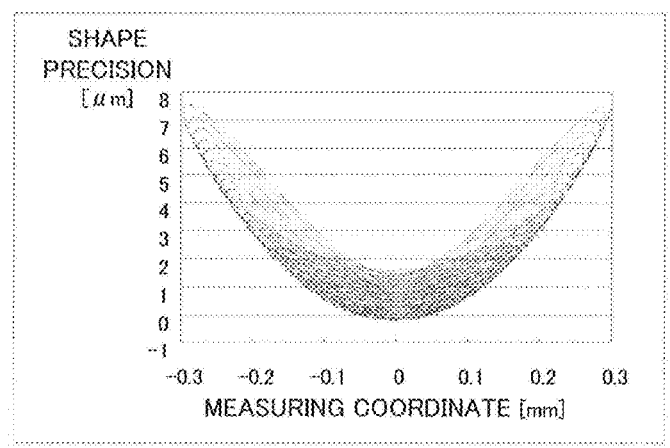
Figure 16B:
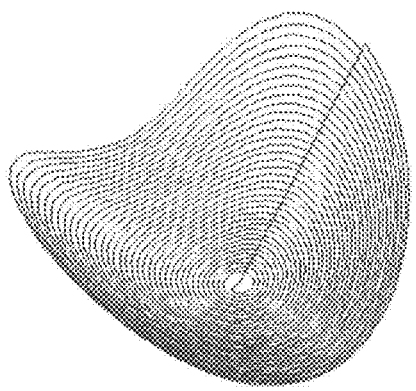

FIGS. 16A and 16B are views describing an example in which a lens shape is measured on the basis of a measurement which is carried out in the lens shape machining according to the present invention, after machining along the first spiral path of the lens shape machining. FIG. 16A is a view obtained by plotting error values with respect to an X coordinate, and FIG. 16B is a view obtained by three-dimensionally plotting measurement data obtained by measuring along the spiral measurement path. After the first machining, the shape error is greatly bent and comes to a completely asymmetrical data, due to a tool profile error, an asymmetry (a rotation oscillation) of a rotating locus of the tool or the like.

Figure 17A:
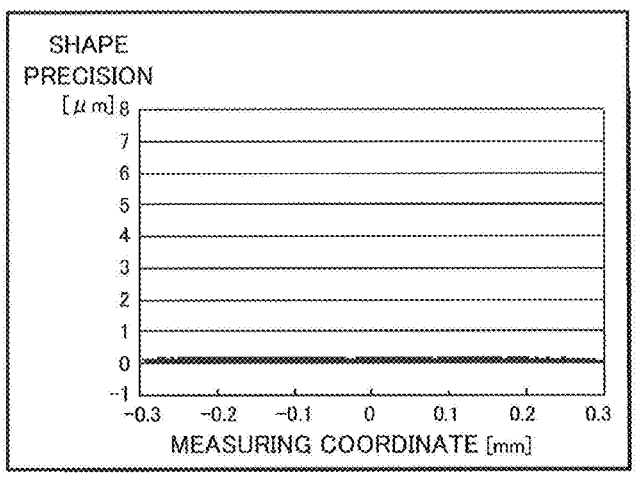
Figure 17B:
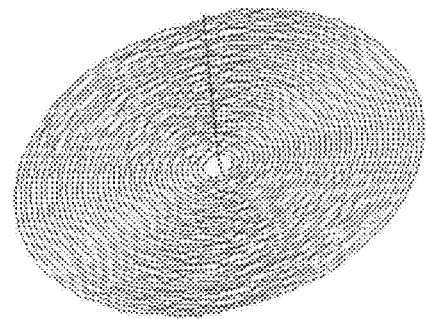
Figure 19:
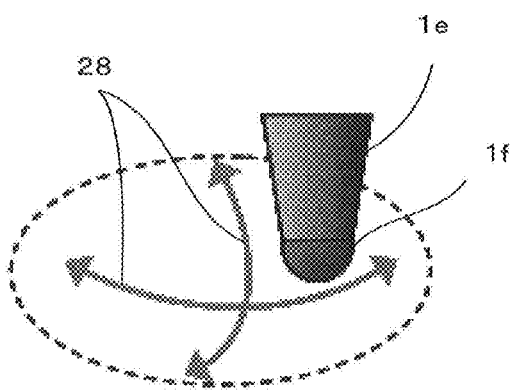
FIG. 19 is a view describing a cruciform section measurement as a measuring method of a conventional lens array metal mold.

FIGS. 17A and 17B are views describing a measurement result which is obtained by determining a compensated machining amount according to a method of the present invention, carrying out the machining along the spiral machining path again by adding the compensated machining amount to the first spiral machining path in FIG. 16 and then carrying out the measurement along the spiral measurement path again. FIG. 17A is a view obtained by plotting the error values with respect to the X coordinate, and FIG. 17B is a view obtained by three-dimensionally plotting the measurement data obtained by measuring along the spiral measurement path. The rolling shape error such as the measurement after the first machining illustrated in FIG. 16 runs short, and comes to a flat shape error, thereby showing that the shape error is improved.

A description will be given of a process for carrying out the machining and the measurement according to the present invention by using a flowchart in FIG. 18. The description will be given below according to each of steps.

[Step SA01] The lens shape is machined in the workpiece according to the spiral machining path.

[Step SA02] The shape measurement data is acquired by measuring the shape of the machined lens along the spiral measurement path by means of the onboard measuring device.

[Step SA03] The interpolated shape measurement data is calculated at the intersecting point of the radial line passing through the center of the lens shape and the spiral measurement path, from the shape measurement data acquired in step SA02.

[Step SA04] The shape error amount is calculated at the intersecting point of the radial line and the spiral measurement path.

[Step SA05] Determination is made as to whether the shape error amount calculated in step SA04 is within an allowable range or not, and if it is within the allowable range, then the process is finished, whereas if it is not within the allowable range, then the process returns to step SA06 where machining is performed again.

[Step SA06] The compensated machining amount at the intersecting point of the radial line and the spiral machining path is calculated.

[Step SA07] The machining point compensated machining amount on the spiral machining path is calculated on the basis of the compensated machining amount calculated in step SA06.

[Step SA08] The compensated machining path is created on the basis of the machining point compensated machining amount calculated in step SA07, and the process returns to step SA01.

The invention claimed is:

1. A lens shape machining method of machining a lens shape by using a lens shape machining device which has an onboard measuring device, and relatively moving a tool and a machining object along a spiral machining path, the method comprising the steps of:

machining along the spiral machining path;

acquiring shape measurement data by relatively moving a probe of the onboard measuring device with respect to the machining object along a spiral measurement path having a radius increasing and decreasing amount which is larger than a radius increasing and decreasing amount of the spiral machining path, after the machining, and measuring the machining object at a measurement point on the spiral measurement path by the onboard measuring device;

determining interpolated shape measurement data at an intersecting point of a plurality of radial lines passing through a center of the lens shape and the spiral measurement path by interpolating the shape measurement data;

determining a shape error amount which is a deviation between the interpolated shape measurement data and reference data, at the intersecting point of the radial lines and the spiral measurement path;

determining a compensated machining amount for removing the machining error at the machining point which is the intersecting point of the radial lines and the spiral machining path, on the basis of the determined shape error amount;

determining a machining point compensated machining amount at each of the machining points on the spiral machining path, on the basis of the determined compensated machining amount;

creating a compensated machining path on the basis of the determined machining point compensated machining amount; and executing the machining of the machining object by relatively moving the tool of the lens shape machining device and the machining object along the created compensated machining path.

2. The lens shape machining method according to claim 1, wherein the compensated shape measurement data is determined by interpolating the shape measurement data at the measurement point according to a linear approximation or a curvilinear approximation of the shape measurement data.

3. A lens shape machining device for machining a lens shape by using the lens shape machining device having an onboard measuring device, and relatively moving a tool and a machining object along a spiral machining path, the device comprising:

a shape measurement portion which acquires a shape measurement data by relatively moving a probe of the onboard measuring device with respect to the machining object along a spiral measurement path having a radius increasing and decreasing amount which is larger than a radius increasing and decreasing amount of the spiral machining path, after the machining along the spiral machining path, and measuring the machining object at a measurement point on the spiral measurement path by the onboard measuring device;

an interpolated shape measurement data calculating portion which determines interpolated shape measurement data at an intersecting point of a plurality of radial lines passing through a center of the lens shape and the spiral measurement path by interpolating the shape measurement data;

a shape error amount calculating portion which calculates a shape error amount which is a deviation between the interpolated shape measurement data and reference data, at the intersecting point of the radial lines and the spiral measurement path;

a compensated machining amount calculating portion which determines a compensated machining amount for removing the machining error at the machining point which is the intersecting point of the radial lines and the spiral machining path, on the basis of the determined shape error amount;

a machining point compensation amount calculating portion which determines a machining point compensated machining amount at each of the machining points on the spiral machining path, on the basis of the determined compensated machining amount; and a compensated machining path creating portion which creates a compensated machining path on the basis of the determined machining point compensated machining amount, wherein the machining of the machining object is executed by relatively moving the tool of the lens shape machining device and the machining object along the created compensated machining path.

4. The lens shape machining device according to claim 3, wherein the compensation shape measurement data calculating portion determines the interpolated shape measurement data by interpolating the shape measurement data at the measurement point according to a linear approximation or a curvilinear approximation of the shape measurement data.

* * * * *